Patented July 9, 1935

2,007,333

UNITED STATES PATENT OFFICE 2,007,333

METHOD OF TREATING NATURAL GUMS AND PRODUCT RESULTING THEREFROM

Wilhelm Krumbhaar, Detroit, Mich.

No Drawing. Application May 5, 1934,
Serial No. 724,225

13 Claims. (Cl. 134—26)

The invention relates to the treatment of natural gums, particularly copal gums, for the purpose of rendering them more suitable for use in the manufacture of varnishes and the like. Various methods have been proposed for this purpose, but all such methods known to me have possessed disadvantages, which may be avoided by the present process. The improved process, briefly stated, preferably includes the steps of masticating the gum while in the plastic state to render the same more soluble and more reactive, dissolving the masticated gum in a suitable solvent and then neutralizing the acidity of the gum in any suitable manner.

In the prior art it is known to treat copal gums by heating to a dangerously high temperature (600° F. and even higher) and neutralizing after heat treatment. The copal gums may be treated either alone or in combination with other resins such as colophony. It has been found, however, that the heat treatment of the copal gums requires a temperature which largely destroys the valuable properties of the gum, owing to the breaking down of a part at least of the dibasic acids in the gums into the less valuable monobasic acids. Moreover, by this drastic treatment, the color is darkened, the combination of hardness and toughness is lost, and the gum becomes dark and brittle.

Mastication of rubber and of synthetic rubberlike masses is also known, but so far as I am aware, such treatment has never been applied to copal resins for rendering them more soluble and more reactive preparatory to neutralization. Pulverizing of copal gums has been recommended for the purpose of increasing their solubility, but such pulverizing has been effective only to a very limited extent, and then in reference to only a limited number of solvents, and besides does not practically increase the reactivity at all. By treating copal gums in accordance with my improved process, including the preliminary step of masticating the gum to a great extent, the complex structure is somewhat broken down until the gum becomes more soluble and more reactive. The disadvantages of former processes of treating copal gums to be used in varnish manufacture are thus avoided, and certain very desirable ends are attained. These advantages include (1) the retaining of the combination of physical toughness and hardness of the original gum; (2) the retaining of most of the valuable dibasic acids of such gums; (3) the ability to react such masticated gums at comparatively low temperatures with metal oxides or hydroxides, alcohols and other agents for neutralizing the acidity of the gum; (4) solubility in a greater variety of solvents; (5) a great reduction in the amount of solvent necessary to dissolve the gums or to form a solution of equal viscosity; and (6) better compatibility of the treated gums with oils, fatty acids, rosin and many other materials used in the varnish industry, and their ability to combine therewith at much lower temperatures than the untreated copal gums; and (7) the color of the neutralized product is much lighter than that obtained as a result of the drastic decomposition processes. It will be understood that the advantages above enumerated are mentioned as among the most striking, but other advantages will be apparent to those skilled in the art.

The invention will be more fully understood by reference to the following detailed description of the process, including various specific examples, it being understood that the detailed description is intended only as illustrative of the basic invention involved and not as a limitation thereof.

The first step in my processing of copal gums is to break down the molecular structure only so far as is necessary in order to render the copal more soluble and more reactive. The raw copal gum of medium hardness is soluble only in a few solvents, for instance, in cyclohezanol acetate, giving solutions of high consistency even if only 15% solid content were present. The partial breakdown of molecular structure of the copal may be achieved by mastication with resulting improvement in solubility and reactivity. This mastication takes place on heated roller mills or other suitable types of mixers, the gum being preferably pulverized beforehand so as to prevent loss from the cracking up of the resin on the rolls. The copal becomes soft and plastic at about 175° F., and can be rolled out into thin sheets which can be again returned to the rolls for further mastication process by means known to those skilled in the art. In the mastication, the rolls must be closely spaced so that the most powerful pressure obtainable can be applied. The mastication can be accomplished as low as 175° F. for some grades of copal resin, but usually the process is most efficient at temperatures of 250°–300° F. However, there are some grades which require higher temperatures, even up to 400° F. or more. The time required in the mastication process varies with respect to the different grades of copal gum used, and may vary from 20–30 minutes in some instances to 2 hours in others, as set forth in the accompanying examples. It will be understood that these periods are not to be considered as absolute limits, but as illustrative only. At the same time that mastication is taking place, vacuum may be applied in order to facilitate the removal of the volatile products.

The second step in the process consists of dissolving the masticated gum. The solution can be effected not only by the usual methods, but also by combining the first and second steps on the rolls. This can be easily done if the solvent is of a non-volatile nature, such as oils, fatty acids, resinous acids, high-boiling esters and the like, but must be done under special apparatus if the solvent is volatile, such as butanol.

As just mentioned, among the solvents for the mastication of gum may be included not only both the volatile and non-volatile solvents, but also mixtures or combinations of both kinds of solvents. Among the volatile solvents there may be mentioned as typical, in addition to the alcohols referred to above, such solvents as amyl-acetate, cyclohexanol-acetate and pine oil. Among the non-volatile solvents which may be used are resinous and fatty acids and their glycerides as well as high-boiling esters. These particular solvents are mentioned only by way of illustration and not by way of limitation.

The third step consists of neutralizing the gum which has been rendered more soluble and reactive. This third step can take place alone as an independent step, or it can be combined with the first step, omitting the second step, or it can be combined with the first and second steps. Among the materials which may be used in the neutralization of the gum are any metal oxides, such as calcium oxide, litharge, etc., or hydroxides, such as slaked lime, lye, potash, etc., or salts of metals, the radicles of which may be easily volatilized, such as the acetates.

In neutralization, alcohols not only of the monobasic and polybasic types may be used, but also partially esterified alcohols such as mono- and di-acetin, mono- and di-olein, and mono- and di-glyceridic abietates, mono- and di-glycerides of drying and non-drying oil acids, and the like. This also includes phenolic alcohols both simple and condensed.

When the steps of mastication, solution and neutralization are taken in succession, either the alcohols or the metal compounds may be used according to regular procedure without difficulty. When neutralization takes place on the rolls immediately following sufficient milling to render the gum uniform and reactive, the metal compounds are more efficiently used, because they react more quickly than the esterifying agents. The use of vacuum to remove the water formed during neutralization facilitates the reaction.

After mastication has taken place, thus rendering the copal gum more soluble and more reactive, there are also other processes than neutralization which may be employed to further modify the characteristics of the gum. For example, the resin may be halogenated, treated with oxygen or sulphur to make it spirit-soluble, or it may be treated with amines, particularly with resinous amines or resin-forming amines.

The following specific examples are given to illustrate the manner of carrying out my invention and the character of the products derived therefrom:

*Example 1.*—On close-set steam-heated rolls, hard manila copal of a proper amount to insure good milling is introduced. After 20-30 minutes of hard thorough milling at a temperature of approximately 275° F., the milled product is then withdrawn from the rolls and dissolved in butanol at 230° F. to a 50% solution. After solution has taken place, 1½% of calcium hydrate is added to neutralize acid present in the gum. The water of neutralization and the butanol may be removed by distillation.

*Example 2.*—Congo copal is masticated at 300° F. for approximately 1 hour. The gum is then removed from the rolls and dissolved in pine oil in the ratio of 100 parts Congo to 150 parts pine oil. The solution is then heated with stirring under a reflux condenser with 7.5 parts of glycerine until esterification is completed.

*Example 3.*—A batch of Congo copal is masticated according to Example 2 and removed from the rolls. After cooling, the gum is pulverized. Equal parts of the powdered gum and rosin are heated together so that a solution takes place. The solution may then be neutralized with 5% of lime, the neutralization process taking place in an open kettle.

*Example 4.*—Mastication and solution at the same time on the rolls:—equal parts of ester gum and benguela copal are milled at 300° F. for 1 hour. Upon completion of milling, the gum mixture is removed from the rolls and reacted with glycerol.

*Example 5.*—Mastication and solution at the same time on the rolls:—equal parts of ester gum and Congo copal are milled at 275° F. for 1 hour (to facilitate solution of the copal, 10% of pine oil may be added). Upon completion of the milling, the gum solution is removed from the rolls and reacted with 20% of glycerol di-linoleate.

*Example 6.*—Mastication and neutralization without intervening solution:—manila copal is milled for 1 hour at 300° F. At the end of this time, 2% of CaO is introduced on the rolls a little at a time, and milled until the oxide has disappeared.

*Example 7.*—Mastication, solution and neutralization may be effected at the same time on the rolls as follows:—50 parts of kauri copal and 50 parts linseed oil are milled together for 2 hours at 250° F. This solution is neutralized on the rolls by milling in 5 parts of litharge.

By the term "masticating" as used in the following claims it will be understood that I have reference to a distorting of the gum while in the plastic state by a mechanical action by which the internal structure is broken down both physically and chemically.

What I claim is:

1. A process for improving a copal gum which comprises heating the gum sufficiently to render it soft and plastic, and masticating the gum while in the plastic state for a sufficient period of time to substantially increase the solubility of the gum in the ordinary varnish solvents and to substantially increase its reactivity at low temperatures with agents for neutralization of the acidity of the gum.

2. A process as set forth in claim 1, wherein the gum is masticated at a temperature below that at which darkening of the product takes place.

3. A process as set forth in claim 1, wherein the gum is masticated at a temperature of from 175° F. to 400° F., depending on the grade of gum employed.

4. A process as set forth in claim 1, wherein the gum is masticated for a period of from 20–30 minutes to 2 hours.

5. A process as set forth in claim 1, wherein the masticated gum is dissolved in a common varnish solvent and the acidity of the gum is neutralized.

6. A process as set forth in claim 1, wherein the copal is masticated together with a solvent for the gum.

7. A process as set forth in claim 1, wherein the copal is masticated together with an equal quantity of ester gum.

8. A process as set forth in claim 1, wherein the masticated gum is reacted with an alcohol at a temperature substantially below that at which reaction with an untreated copal takes place.

9. A process as set forth in claim 1, wherein the masticated copal is dissolved in butanol at a temperature of about 230° F. and the acidity of the copal is neutralized.

10. A process as set forth in claim 1, wherein copal and linseed oil are masticated together for 2 hours at substantially 250° F. and the solution is neutralized on the rolls by the use of litharge.

11. A process as set forth in claim 1, wherein the masticated copal is cooled, pulverized, and heated with rosin until solution takes place, after which the solution is neutralized.

12. A process as set forth in claim 1, wherein the masticated gum is dissolved in pine oil, after which the solution is esterified with glycerine.

13. A composition of matter obtainable according to claim 1, and characterized by (1) retaining the physical hardness and toughness of the original gum, (2) the presence of the valuable dibasic acids of the original gums together with (3) the ability to react at comparatively low temperatures with agents for neutralizing the acidity of the gum, (4) solubility in the ordinary varnish solvents at low temperatures, and (5) light color of the neutralized product as compared with products obtained by decomposition processes.

WILHELM KRUMBHAAR.